3,423,499
PROCESS FOR SPINNING MODIFIED
XANTHATED POLYMERS
Leland B. Ticknor, Media, Pa., assignor to FMC Corporation, Philadelphia, Pa., a corporation of Delaware
No Drawing. Filed Feb. 18, 1965, Ser. No. 433,809
U.S. Cl. 264—188        2 Claims
Int. Cl. D01f 3/12

ABSTRACT OF THE DISCLOSURE

A method of preparing regenerated cellulose yarns which have a high degree of crimp when immersed in a plasticizing medium, wherein the viscose used for obtaining said yarn is modified by the introduction of an alkali metal stannate, is disclosed herein.

---

It is often desirable to provide modified xanthated polymeric alcohols for various applications. For example, higher viscosity aqueous solutions of starch xanthate produced by crosslinking agents have been found useful per se as sizing materials in the paper making industry.

In some instances, the manufacture of shaped articles of regenerated cellulose requires the use of a viscose or caustic solution of cellulose xanthate having a relatively high viscosity. For example, the dry spinning or the spinning into water of viscose requires a higher viscosity spinning solution, and specific wet spinning methods, such as that described in Japanese Patent No. 172,865 of May 27, 1946 or U.S. Patent No. 2,607,955 of Aug. 26, 1952, find high viscosity spinning solutions of importance.

It is an object of this invention to provide modified xanthated polymeric alcohols.

It is another object of this invention to provide a method of preparing regenerated cellulose articles from a modified viscose which has increased viscosity.

In the manufacture of textiles for use as towels, bedspreads, carpets and rugs it is often desirable to use highly crimped yarn. It is also an object of this invention to provide a method for the preparation of highly crimped regenerated cellulose filaments and yarns.

These and other objects are accomplished in accordance with the present invention which comprises a mixture of a xanthated polymeric alcohol and from 0.2 to 5.0% of an alkali metal stannate based on the weight of the xanthate.

The invention also includes a method of preparing shaped articles which comprises mixing in a viscose solution from 0.005 up to 0.25%, based on the weight of the viscose, of an alkali metal stannate, forming the modified viscose solution into a shaped article, and coagulating and regenerating said article. In the preferred embodiment from about 0.01 to 0.15% by weight of the stannate is incorporated in the viscose and sodium stannate is the preferred alkali metal stannate. However, any soluble tin compound containing tetravalent tin, such as stannic acid, stannic hydroxide, stannic chloride, stannic sulfate, stannic bromide and the like are included within the meaning of alkali metal stannate since after dissolution in the caustic solution these tin compounds will form an alkali metal stannate.

Xanthated polymeric alcohols include, for example, polysaccharide xanthates including starch xanthate, chitin xanthate and cellulose xanthate, and polyvinyl alcohol xanthate.

Caustic solutions of these xanthates are usually formed with from 3 to 10% by weight of caustic such as sodium or potassium hydroxide.

Viscose is formed in a conventional manner and may contain very low amounts of cellulose for the purpose of spinning fine denier filaments. In a preferred form of the invention skin-forming additives or coagulation modifiers are incorporated in the viscose in amounts ranging from about 1 up to about 5% based on the weight of the cellulose. These additives include, for example, polyoxyalkylene glycols such as polyoxyethylene glycols, polyoxypropylene glycols and block copolymers of propylene and ethylene oxides; various amines including monoamines, diamines and polyamines such as diethylamine, dimethylamine, ethylene diamine and diethylene triamine; reaction products of alkylene oxides with fatty acids, fatty alcohols, fatty amines, aromatic acids, aromatic alcohols, aromatic amines, partial esters of fatty acids and polyhydric alcohols such as reaction products of ethylene oxides with $C_6$–$C_{18}$ fatty amines, phenol, lauryl alcohol, glycerol monostearate, etc.; certain quaternary ammonium compounds and the like. Mixtures of these skin-forming additives are also effective.

Introduction of the alkali metal stannate into the viscose is usually accomplished by incorporating an aqueous solution of the stannate in the viscose during the mixing stage or by injecting the stannate solution into the viscose stream prior to extrusion. The stannate reacts with the viscose very quickly so that an increase in viscosity is noticed even when the stannate is injected into the viscose stream.

The incorporation of the alkali metal stannate into the viscose solution will accomplish two ends. The reaction of the stannate with the viscose causes an increase in viscosity of the viscose solution, the extent of which is determined by the amount of stannate introduced and the length of reaction period prior to spinning. The reaction of the stannate with the viscose provides a solution which may be spun into highly crimped filaments and yarns.

While the invention is useful for the production of all types of regenerated cellulose articles such as filaments, yarn, ribbons, films and tubes it is of primary importance in the manufacture of filaments and yarns. The invention will be further described with reference to these articles.

The spinning of the viscose solutions may be either wet or dry so that extrusion of the shaped article will be into a gaseous evaporative medium or preferably an aqueous acid bath or baths.

Where an acid bath with high salt content is selected for the coagulation of the extruded filaments it is preferable for higher strength and crimp that the bath also contain a high zinc salt concentration. Thus, amounts of from about 4 up to 7% of zinc sulfate are desirably incorporated into a bath containing, for example, from 3 to 6% sulfuric acid and from 10 to 18% of sodium sulfate.

When a viscose having a high viscosity of 500 to 1000 poises is used, dilute acid baths such as those described in U.S. 2,607,955 may be employed.

Crimping of filaments and yarns is accomplished by stretching the yarn after coagulation to at least 50% of its original length up to but not exceeding the breaking point of the individual filaments. The actual crimping of the yarn is accomplished by permitting the stretched yarn to shrink in the absence of tension while still wet during the manufacturing process or after drying by treating with a plasticizing medium such as water, preferably hot, or dilute caustic. The yarn is then washed and dried in the crimped condition. Ordinarily, the yarn is cut into staple fiber after stretching and permitted to shrink freely to obtain highly crimped, staple fiber. Or, it may be packaged in the stretched condition and used to manufacture a fabric; the fabric is then treated with hot water or other plasticizing medium to bring out the latent crimp.

To demonstrate the viscosity increase of viscose with the addition of an alkali stannate thereto, the following experiment was performed.

Example I

Amounts of 0.016 and 0.04% by weight of sodium stannate in water solutions were added respectively to tire yarn type viscose solutions. Ball-fall viscosities at 18° C. were measured for the solutions and a control at various times. The results are given in the following table. The viscosity in poises is approximately 1.16 times the Ball-fall time in seconds.

TABLE I

| Time (hours) after mixing | Viscosity (seconds) | | |
|---|---|---|---|
| | Control | 0.016%* | 0.04%* |
| About 1/6 | 108 | 120 | 129 |
| 1½ | 108 | 167 | 296 |
| 18½ | 116 | 180 | 302 |
| 38 | 124 | 212 | 568 |
| 64 | 142 | 270 | 1032 |

*Weight percent stannate mixed with viscose.

It is apparent that although the viscosity enhancement is initially very fast, it then tapers off and may continue for several days. It is believed that higher viscosities at short times after mixing are obtained by using greater amounts of the stannate. If about 0.2% stannate is used, the viscose gels within about 24 hours when held at room temperature. One therefore adjusts the amount of stannate used and the reaction time and temperature to give the desired viscosity or yarn properties. The stannate is essentially a crosslinking agent and as the cross-linking action proceeds each cross-link formed has an increasingly greater effect on the viscosity. When the number of cross-links approaches the number of original polymer molecules, the system gels.

The improvement in crimp obtained in yarns produced in accordance with this invention is demonstrated in the following example.

Example II

A control yarn was spun using a viscose containing 5.0% cellulose, 6.0% sodium hydroxide and 40% carbon disulfide based on the weight of the cellulose. A skin-forming additive mixture of 2%, based on the weight of cellulose, of a polyoxyethylene substituted mixture of $C_8$–$C_{14}$ fatty amines having 15 ethylene oxide units per fatty amine molecule and 1.3% of a polyoxyethylene substituted phenol having 15 ethylene oxide units per phenol molecule was also incorporated in the viscose. The viscose had a Ball-fall viscosity of 120 seconds. The viscose was spun into an acid bath containing 5.5% sulfuric acid, 5.0% zinc sulfate and 13.0% sodium sulfate at 50° C. After leaving the coagulating bath, the yarn was stretched about 105% while traveling through a second bath of 2.0% sulfuric acid, 1.0% zinc sulfate and 2.0% sodium sulfate at 90° C. After stretching the yarn was run through a 5% sulfuric acid bath at 60° C., washed, finished dried and collected on a spool.

Another yarn was spun in a procedure similar to the above except that 0.05% by weight of sodium stannate was incorporated in the viscose, and the skin-forming additive consisted only of 2%, based on the weight of the cellulose, of the polyoxyethylene substituted phenol having 15 ethylene oxide units per phenol molecule. This produced a viscose at spinning having a Ball-fall viscosity of 248 seconds. The yarn was spun in the same manner as the control run into an acid bath containing 4.4% sulfuric acid, 7.0% zinc sulfate and 16.0% sodium sulfate at 50° C. It was then stretched about 75% through the second bath.

Six-inch pieces of the yarns produced were cut and dropped into hot water to determine crimping properties. Properties of the two yarns are set forth in the following table.

TABLE II

| Yarn | Denier/filament | Oven dry | | Crimp [1] | Shrinkage [2] |
|---|---|---|---|---|---|
| | | Tenacity, g./den. | Elongation, percent | | |
| Control | 1.10 | 6.41 | 9.9 | 3 | 4½ |
| Control plus 0.05% sodium stannate | 1.15 | 6.01 | 9.9 | 45 | 2⅜ |

[1] Crimps in original six-inch piece.
[2] Length in inches assumed by original six-inch piece.

From the above table it can be seen that the crimp rating of the yarn produced in accordance with this invention is unexpectedly and greatly increased over the control yarn while other yarn properties remain essentially unchanged.

The ability to spin a very dilute viscose solution is illustrated in the following example.

Example III

A viscose was prepared in a normal way except that it contained only 2.5% cellulose and 3.1% sodium hydroxide. It also contained a skin-forming additive mixture of 2.6%, based on the weight of the cellulose of dimethylamine and 1.3% of a polyoxyethylene substituted phenol having 15 ethylene oxide units per phenol molecule. At the time of mixing, a quantity of 0.05% sodium stannate, based on the weight of viscose, was added. After mixing this viscose solution had a viscosity of 53 seconds at 20° C. by the Ball-fall test. It was spun into a bath containing 5.3% sulfuric acid, 6.0% zinc sulfate and 18.0% sodium sulfate at 65° C. The yarn was stretched 105% during regeneration. The yarn had a denier per filament of 1.38, an oven-dry tenacity of 5.2 g./den. and elongation of 7.5%. When a six-inch length was dropped into hot water, it assumed a length of 1⅝ inches with a very fine crimp. Ordinarily, a viscose containing only 2.5% cellulose would have such high fluidity that yarn of reasonable strength could not be produced. Low cellulose concentrations are useful for the production of very fine (low denier) filaments and for the formation of special cross-sectional shapes.

Various changes and modifications may be made in practicing the invention without departing from the spirit and scope thereof and, therefore, the invention is not to be limited except as defined in the appended claims.

I claim:

1. A method of preparing a filament of regenerated cellulose which comprises mixing in a viscose solution from 0.005 up to 0.25%, based on the weight of the viscose of an alkali metal stannate, and from about 1 up to about 5%, based on the weight of the cellulose in the viscose of a skin-forming additive, forming the viscose solution into a filament, coagulating said filament in an aqueous acid bath containing from 4 to 7%, based on the weight of the bath of a zinc salt, then stretching said filament at least 50% up to and not exceeding the breaking point of the filament, and drying the filament.

2. The method of claim 1 wherein the alkali metal stannate is present in an amount ranging from 0.01 to 0.15% and the alkali metal is sodium.

References Cited

UNITED STATES PATENTS

| | | | |
|---|---|---|---|
| 2,052,558 | 1933 | Dreyfus | 8—130 X |
| 2,439,034 | 4/1948 | Battista | 264—198 X |
| 2,515,834 | 7/1950 | Nicoll | 264—168 X |
| 2,686,709 | 8/1954 | Woodell | 264—168 |
| 2,860,480 | 11/1958 | Cox | 264—197 X |
| 2,914,414 | 11/1959 | Novak et al. | 106—165 X |
| 2,993,798 | 7/1961 | Hildebrandt et al. | 106—165 |
| 3,202,748 | 8/1965 | Naka et al. | 106—165 X |
| 3,218,181 | 11/1965 | Itaya et al. | 264—194 X |
| 3,277,226 | 10/1966 | Bockno et al. | 264—188 X |
| 3,340,340 | 9/1967 | Mytum | 264—168 |

FOREIGN PATENTS 827,558    2/1960    Britain.

JULIUS FROME, *Primary Examiner.*

J. H. WOO, *Assistant Examiner.*

U.S. Cl. X.R.

106—165; 264—191